US011878405B1

(12) United States Patent
Downs

(10) Patent No.: US 11,878,405 B1
(45) Date of Patent: Jan. 23, 2024

(54) COLLAPSIBLE PORTABLE WORKTABLE

(71) Applicant: Charles Downs, Grenada, MS (US)

(72) Inventor: Charles Downs, Grenada, MS (US)

( * ) Notice: Subject to any disclaimer, the term of this patent is extended or adjusted under 35 U.S.C. 154(b) by 0 days.

(21) Appl. No.: 17/983,518

(22) Filed: Nov. 9, 2022

(51) Int. Cl.
*B25H 1/04* (2006.01)

(52) U.S. Cl.
CPC .................................... *B25H 1/04* (2013.01)

(58) Field of Classification Search
CPC .. B25H 1/00; B25H 1/04; A47J 47/005; A47J 47/16
USPC ........... 269/16, 136, 137, 138, 291; 108/124
See application file for complete search history.

(56) References Cited

U.S. PATENT DOCUMENTS 2,325,592 A * 7/1943 Degler .................... A47C 4/02 182/186.3
3,481,430 A 12/1969 Solomon
4,433,753 A 2/1984 Watson
5,351,730 A 10/1994 Lewellen
6,155,318 A 12/2000 Underwood
8,042,653 B2 * 10/2011 Grebinoski ............... E04G 1/30 182/223
8,544,391 B2 10/2013 Knox
9,622,568 B1 * 4/2017 Lin ...................... A47B 13/081
9,681,747 B1 * 6/2017 Pectol .................. A47B 13/083
2006/0191446 A1 * 8/2006 Discacciati .............. A47B 3/12 108/59
2007/0056482 A1 * 3/2007 Robinson ............... A47B 37/04 108/25

FOREIGN PATENT DOCUMENTS

CA 2627812 10/2008

* cited by examiner

*Primary Examiner* — Don M Anderson
*Assistant Examiner* — Christopher Soto

(57) ABSTRACT

A worktable system for providing a work surface that is collapsible and portable includes a foldable tabletop that is positionable over a foldable support assembly. The tabletop has a plurality of recesses, and each of a plurality of insertion panels releasably couplable to the tabletop when positioned in one of the plurality of recesses. The insertion panels are removable to make room for a table saw or other tool that is positionable in the recess.

15 Claims, 9 Drawing Sheets

COLLAPSIBLE PORTABLE WORKTABLE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to worktable systems and more particularly pertains to a new worktable system for providing a work surface that is collapsible and portable.

(2) Description of Related Art Including Information Disclosed Under 37 CFR 1.97 and 1.98

The prior art relates to worktable systems which are collapsible. Some worktable systems of the prior art have adjustable heights. However, the prior art does not disclose a foldable tabletop with a plurality of recesses for holding either panels that have top surfaces aligned with a top surface of the table top or with a tool such as a table saw.

BRIEF SUMMARY OF THE INVENTION

An embodiment of the disclosure meets the needs presented above by generally comprising a support assembly and a tabletop. The support assembly comprises a platform having a pair of ends, a top side, and a bottom side. Each of a pair of leg assemblies is coupled to the bottom side of the platform adjacent to an associated one of the pair of ends. Each of the pair of leg assemblies extends downwardly from the platform when the worktable system is positioned in a use configuration. The tabletop is positioned on the top side of the platform when the worktable system is positioned in the use configuration. The tabletop has a front side, a back side, and a pair of lateral sides, each lateral side extending between the front side and the back side. The tabletop has a plurality of recesses, and each recess extends into a respective one of the front side, the back side, and the pair of lateral sides of the tabletop. The tabletop comprises a pair of pivotably interconnected table panels. A top surface of one of the pair of table panels is laterally aligned with a top surface of another one of the pair of table panels and the top surface of each table panel faces upwardly when the worktable system is positioned in the use configuration. Each of a plurality of insertion panels is complementary in shape to and positioned within a respective one of the plurality of recesses. Each insertion panel is releasably coupled to the tabletop such that a top surface of the insertion panel aligns with the top surface of each table panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
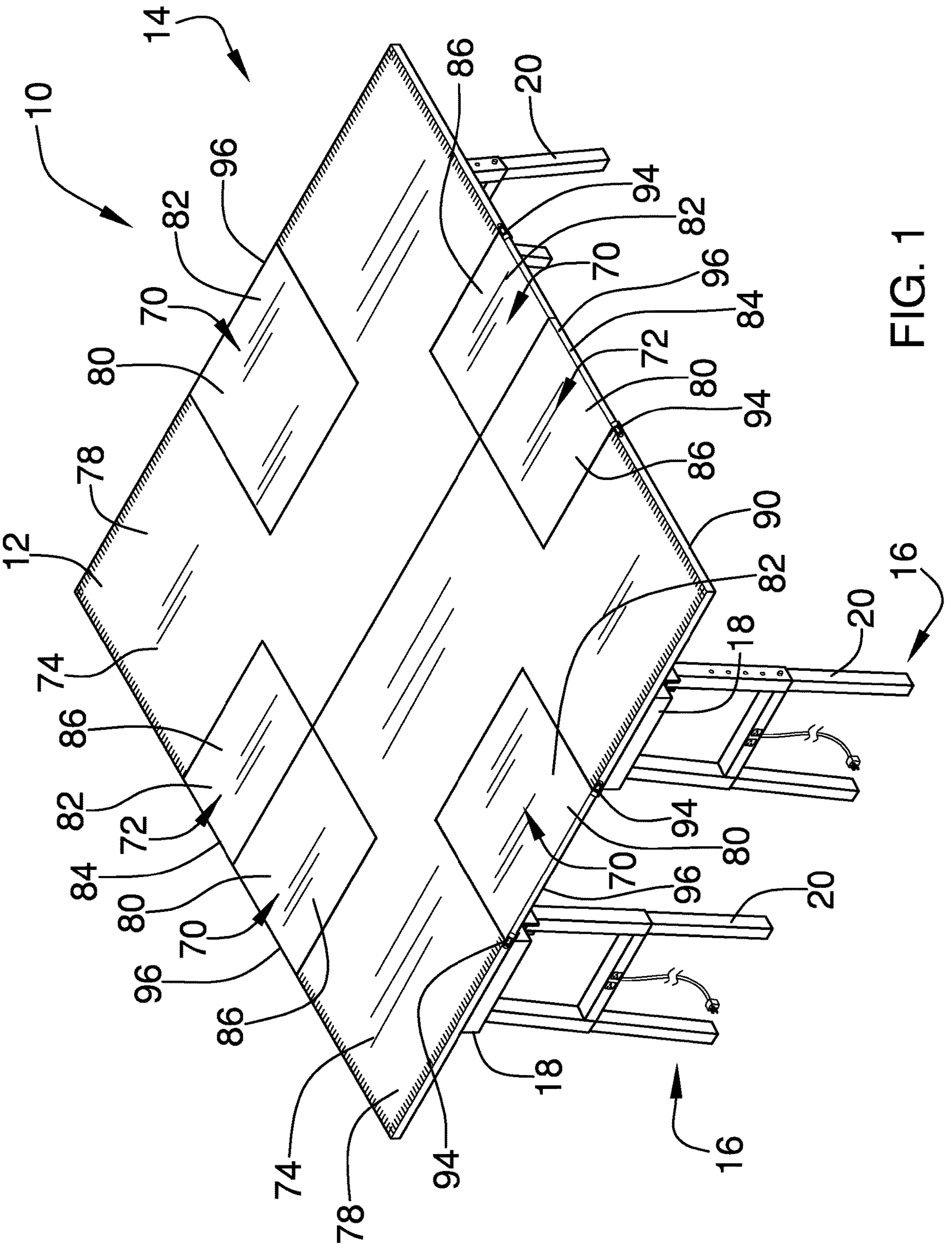
FIG. 1 is a top front side perspective view of a worktable system according to an embodiment of the disclosure.
Figure 2:
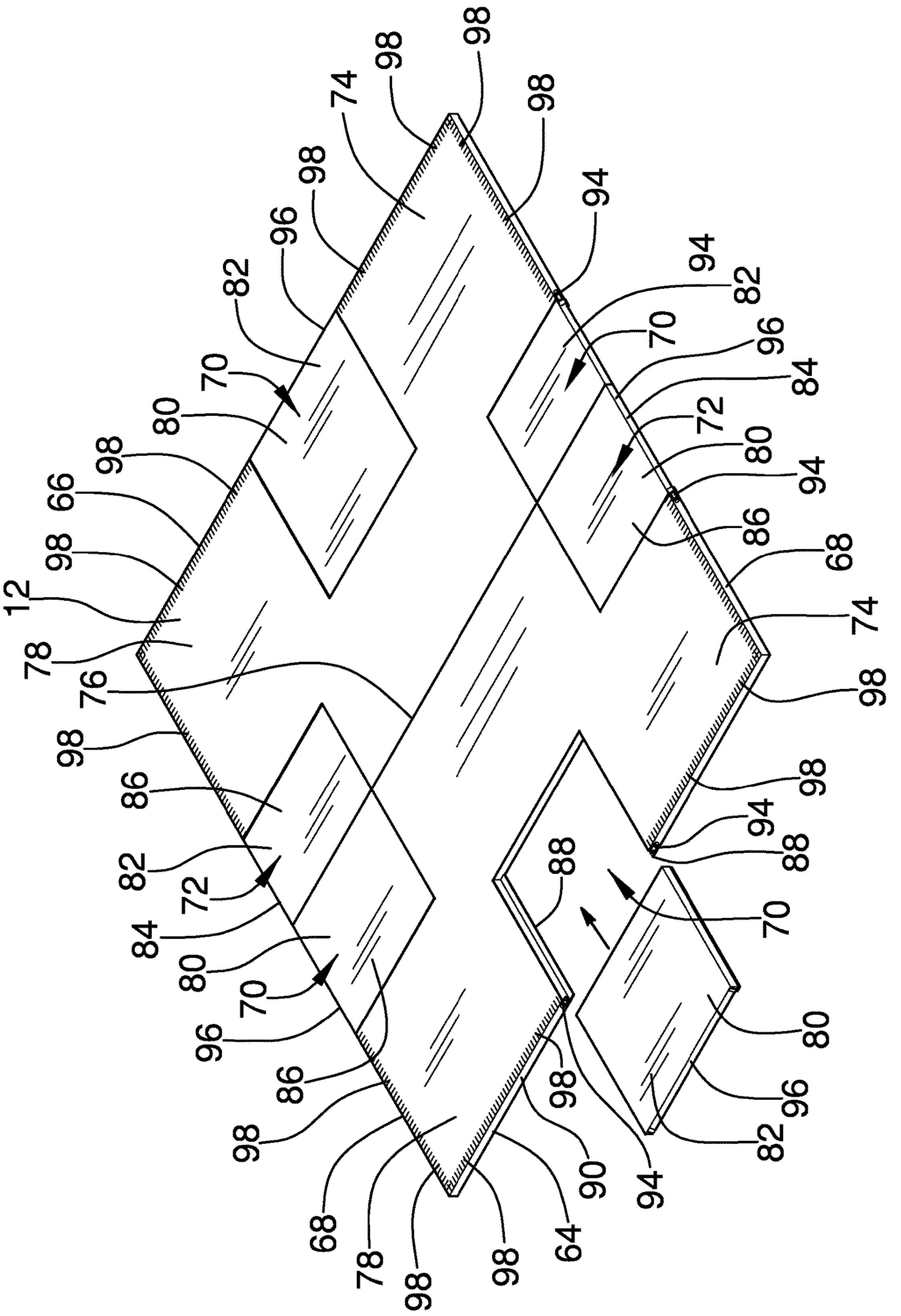
FIG. 2 is a top front side perspective view of a tabletop of an embodiment of the disclosure.
Figure 3:
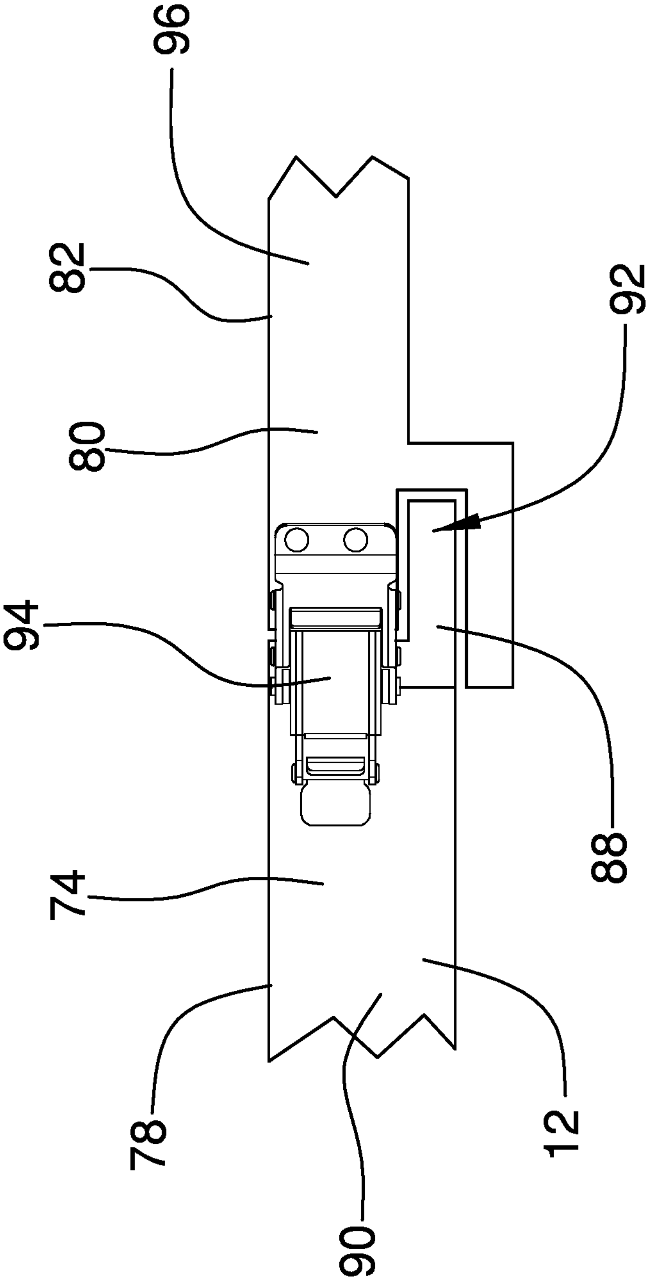
FIG. 3 is a detail side view of an embodiment of the disclosure.
Figure 4:
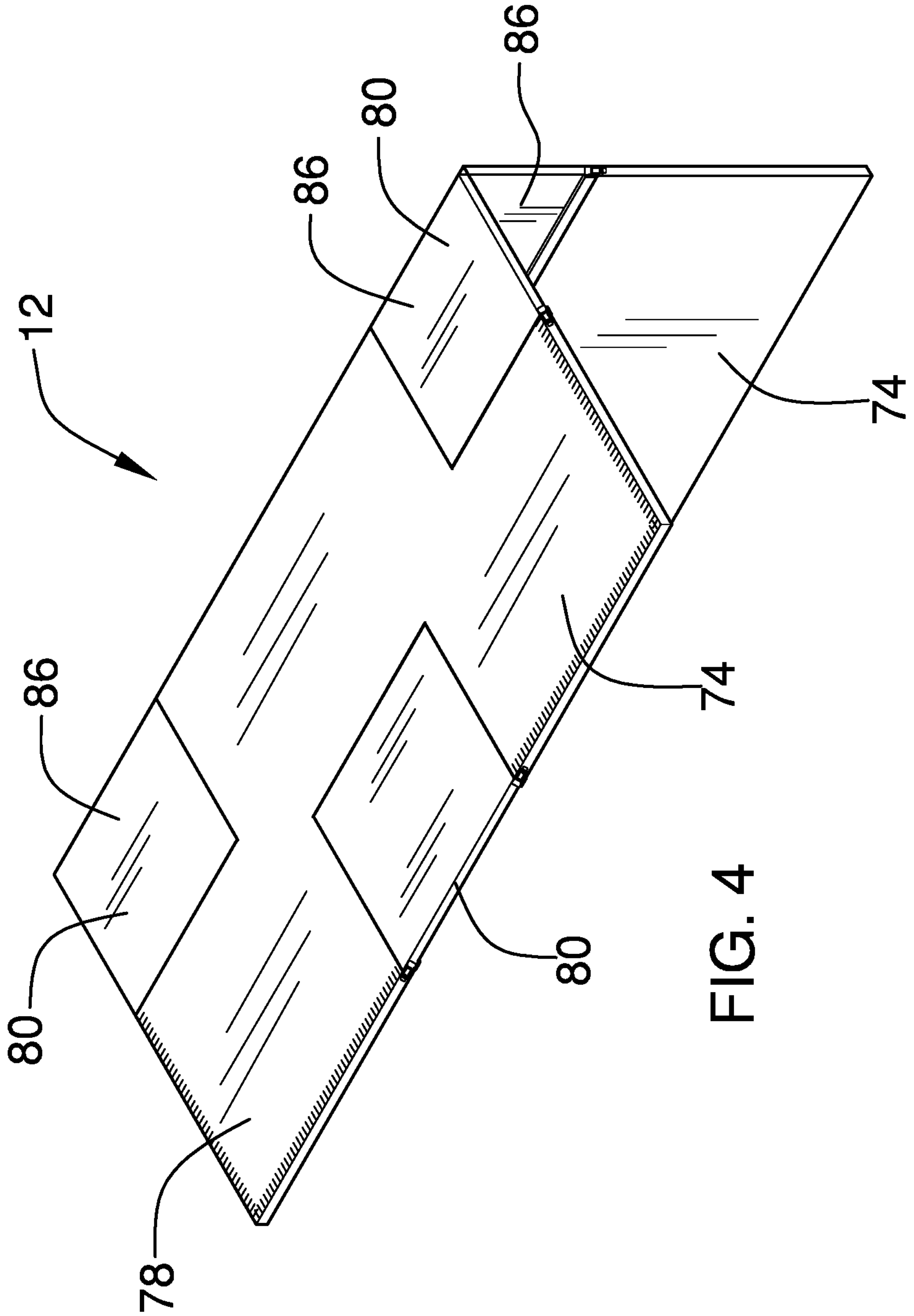
FIG. 4 is a top front side perspective view of a tabletop of an embodiment of the disclosure.
Figure 5:
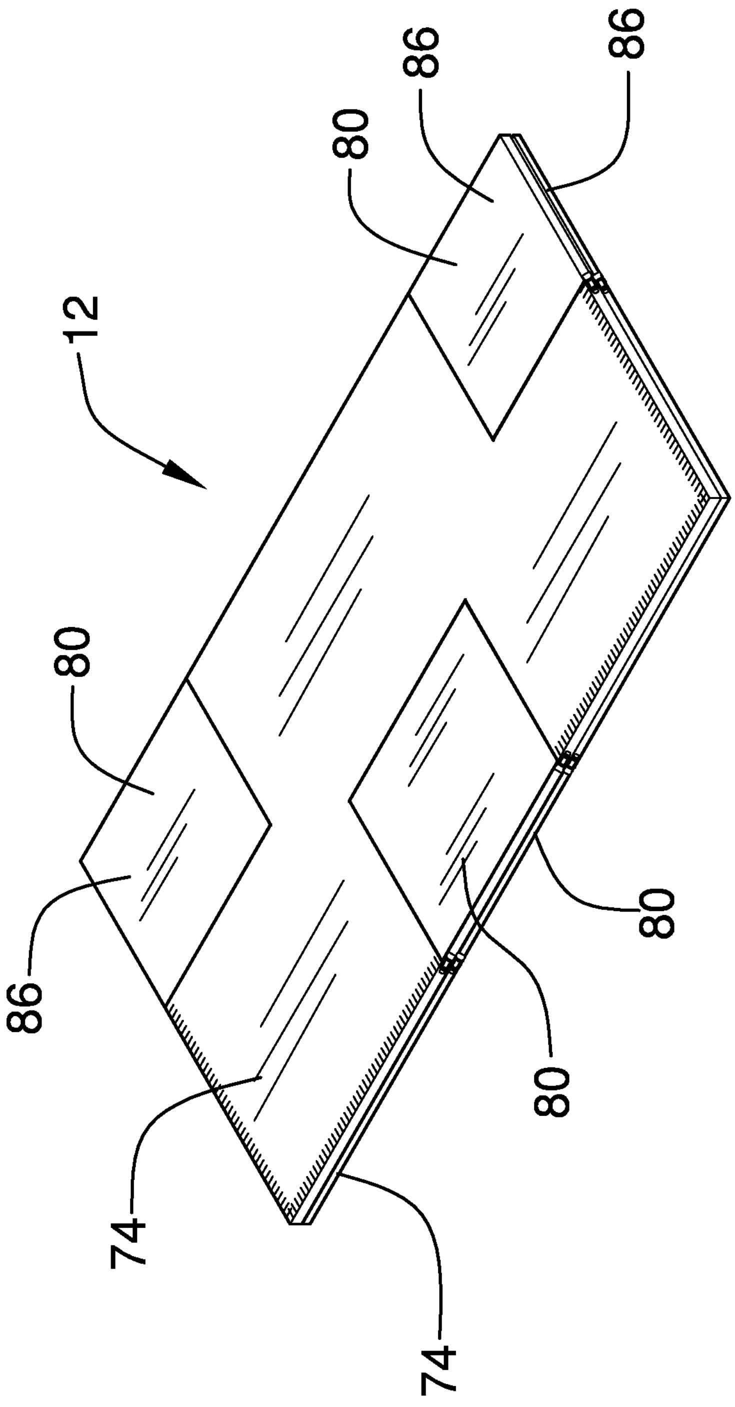
FIG. 5 is a top front side perspective view of a tabletop of an embodiment of the disclosure.
Figure 6:
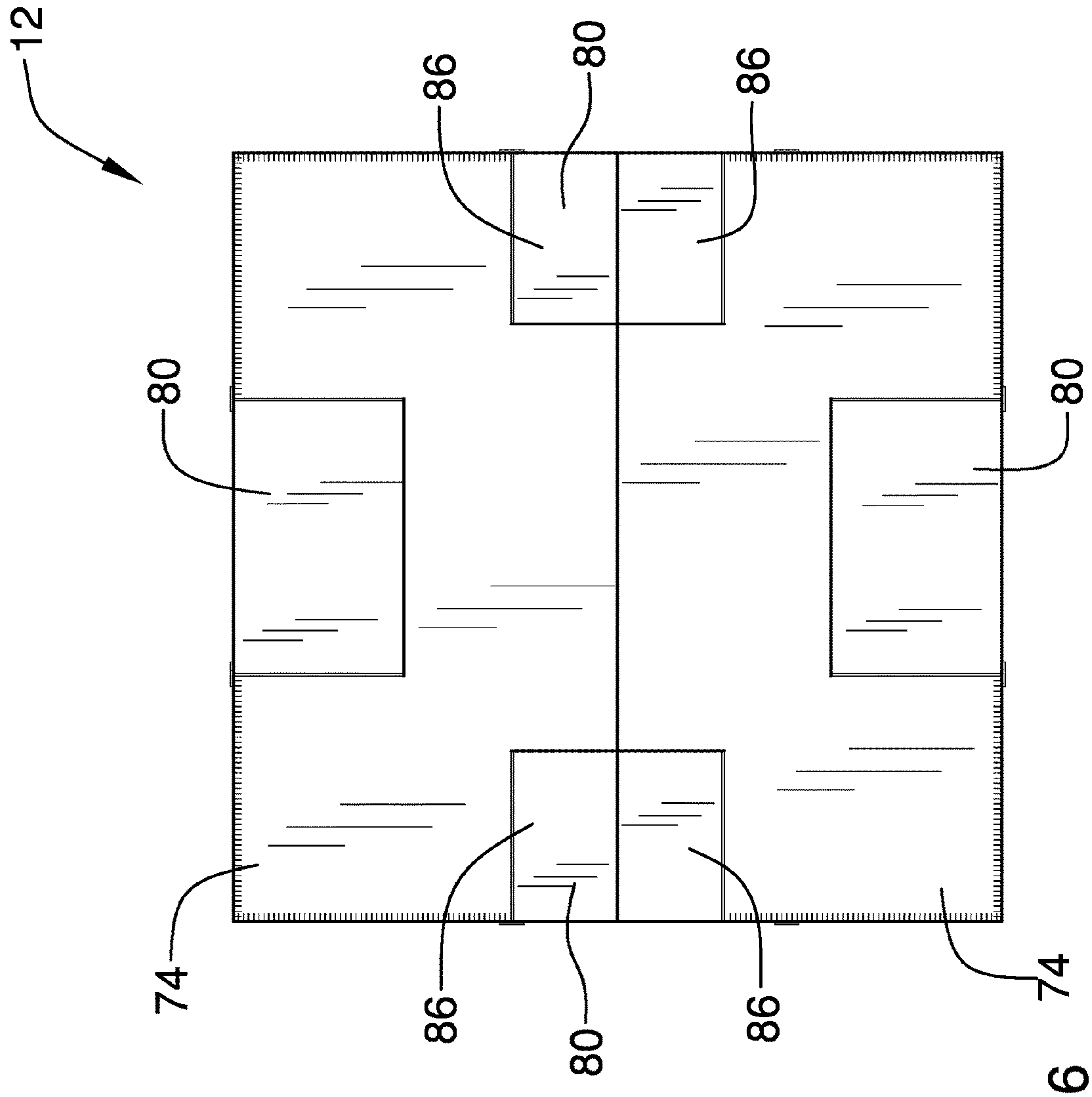
FIG. 6 is a top view of a tabletop of an embodiment of the disclosure.
Figure 8:
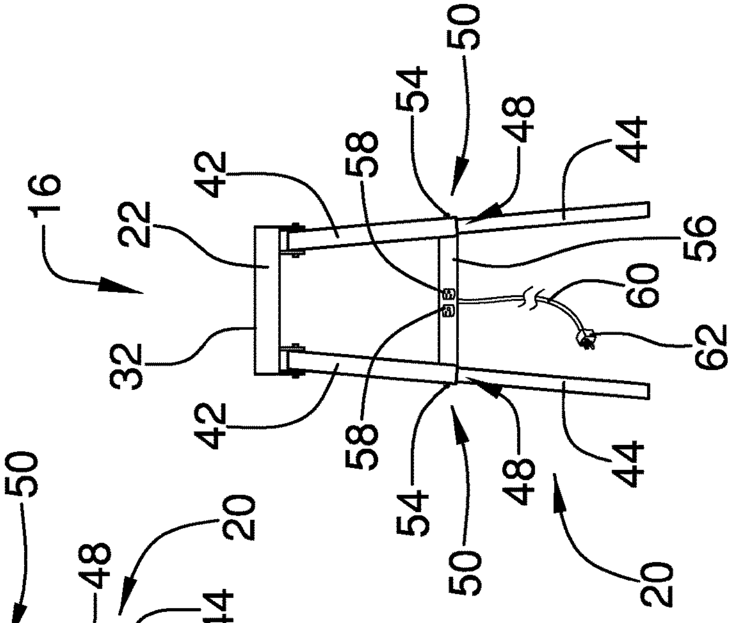
FIG. 8 is an end view of a support assembly of an embodiment of the disclosure.
Figure 7:
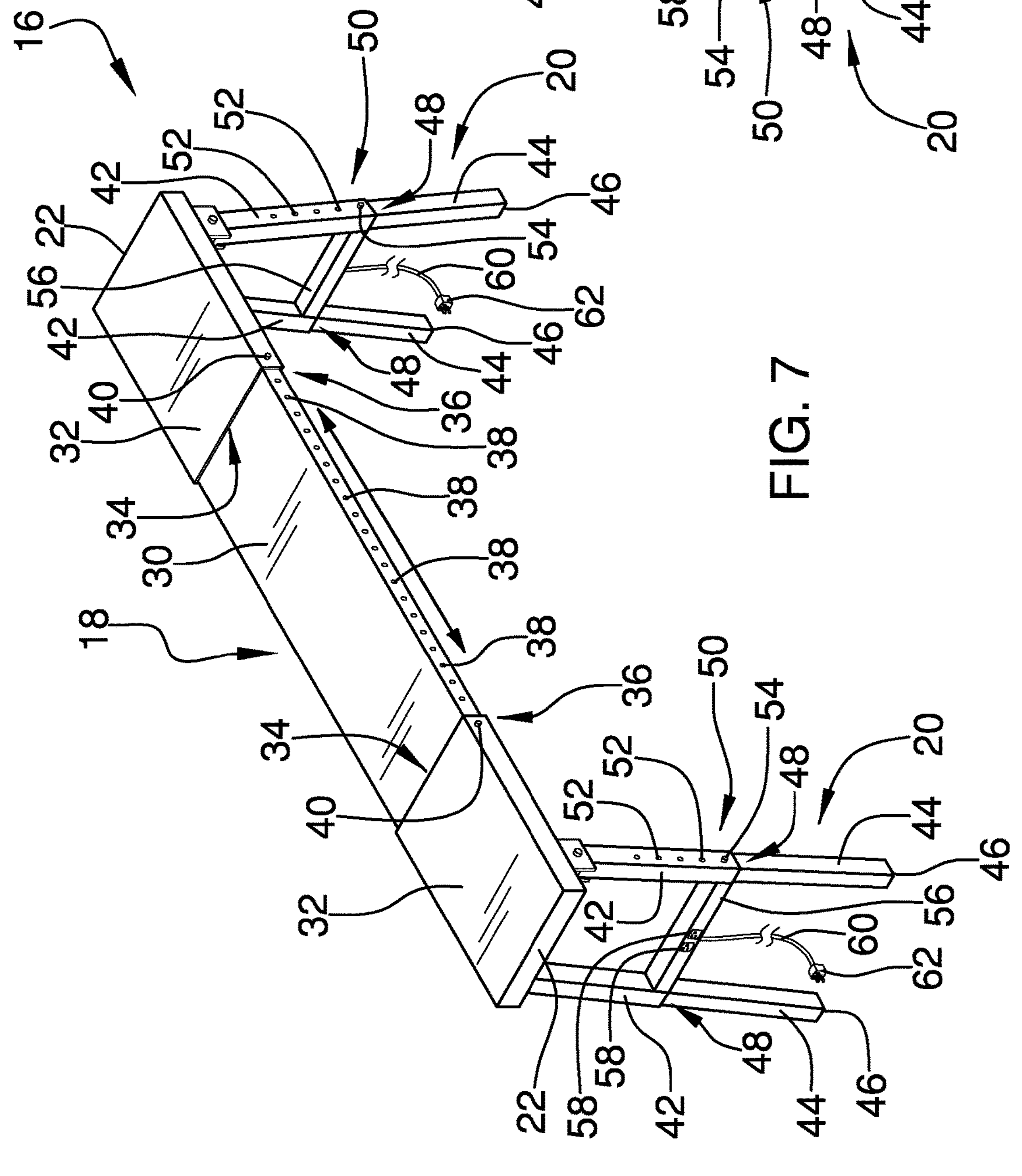
FIG. 7 is a top front side perspective view of a support assembly of an embodiment of the disclosure.
Figure 9:
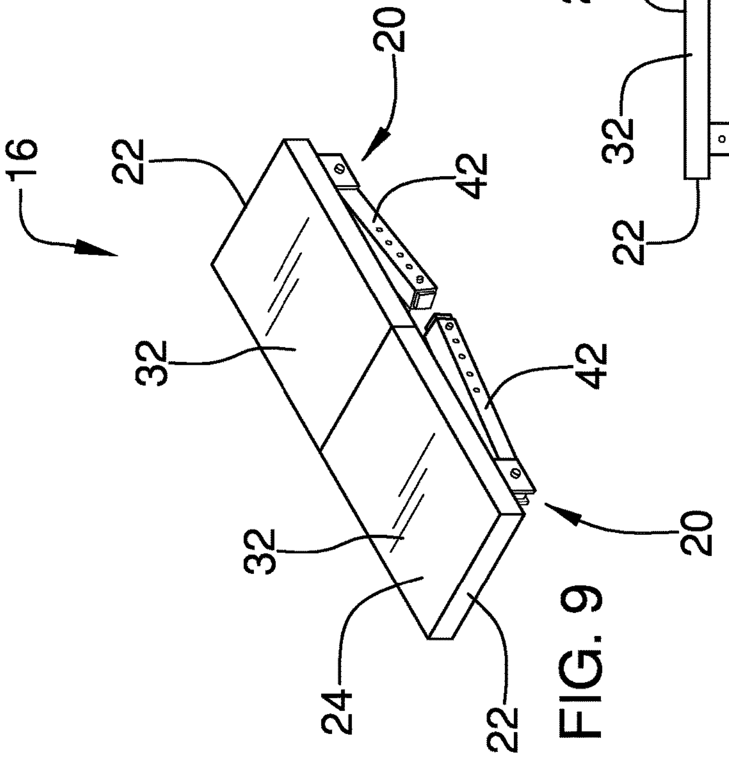
FIG. 9 is a top front side perspective view of a support assembly of an embodiment of the disclosure.
Figure 10:
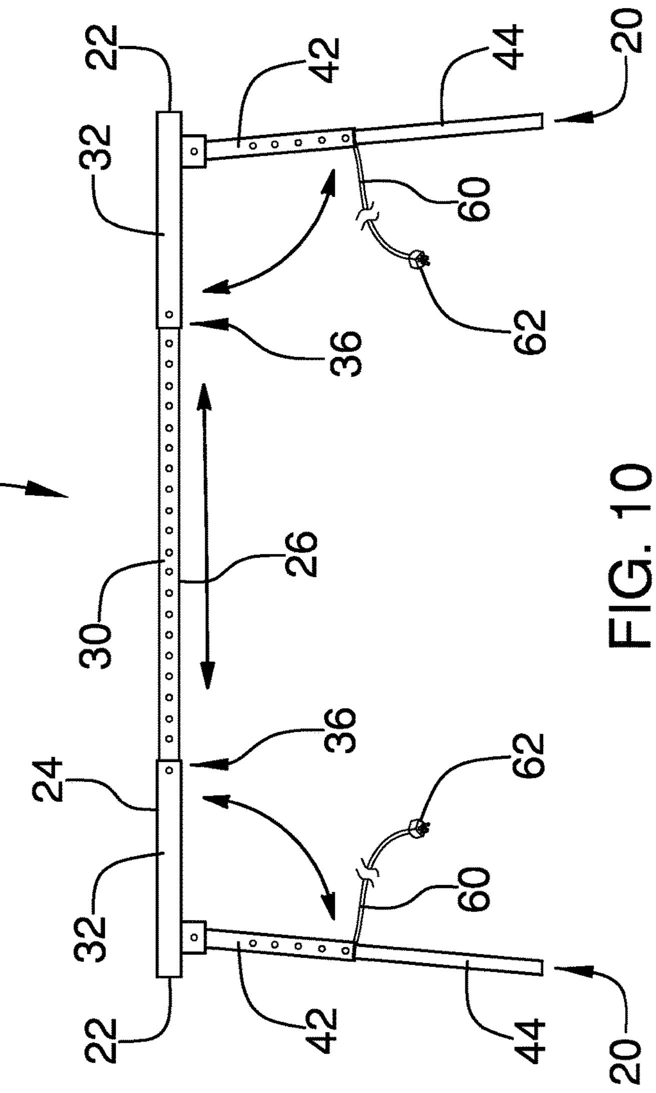
FIG. 10 is a side view of a support assembly of an embodiment of the disclosure.
Figure 11:
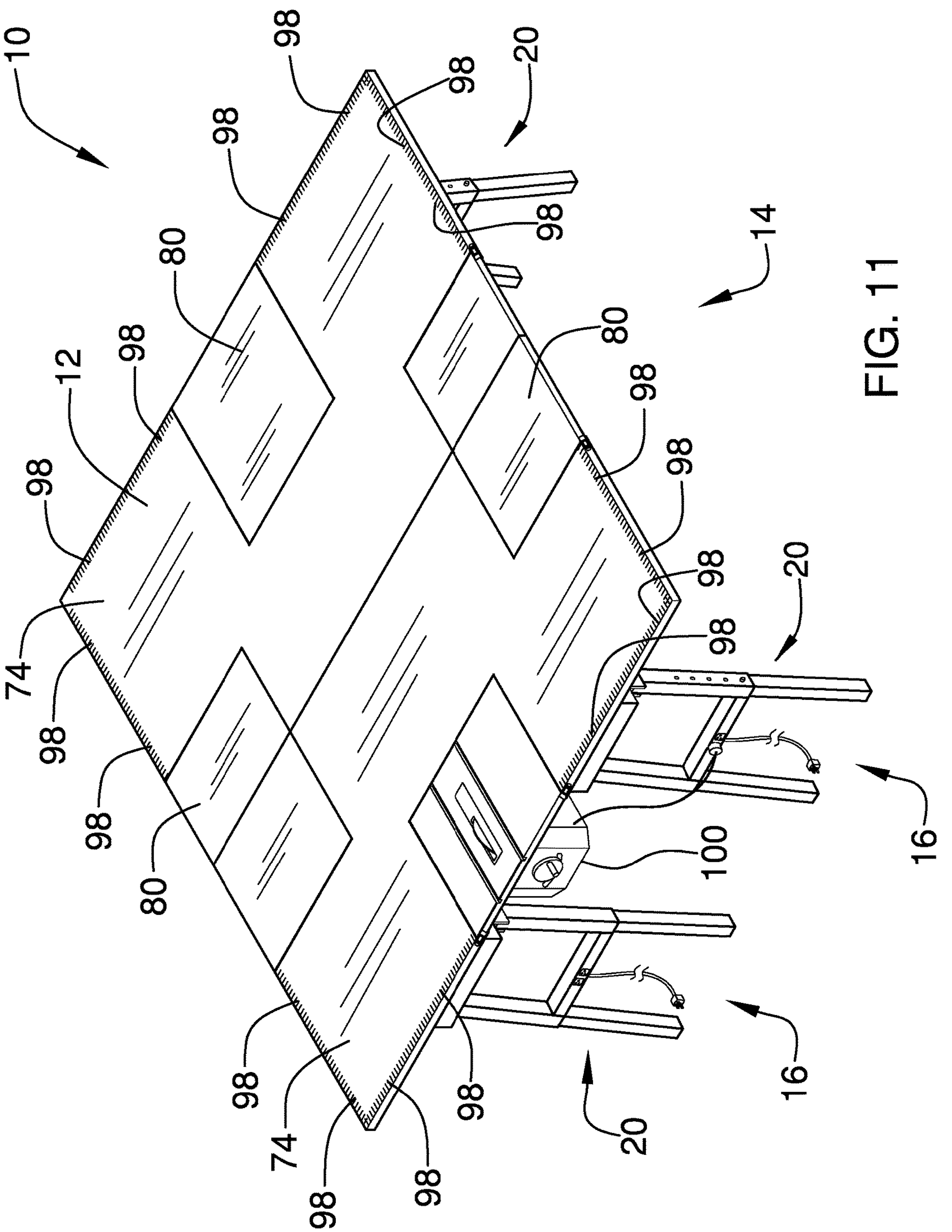
FIG. 11 is a top front side perspective in-use view of an embodiment of the disclosure.

With reference now to the drawings, and in particular to FIGS. 1 through 11 thereof, a new worktable system embodying the principles and concepts of an embodiment of the disclosure and generally designated by the reference numeral 10 will be described.

As best illustrated in FIGS. 1 through 11, the worktable system 10 generally comprises a tabletop 12 and a pair of support assemblies 16. The tabletop 12 is positioned on both support assemblies 16 when the worktable system 10 is positioned in a use configuration 14. Each support assembly 16 comprises a platform 18 and a pair of leg assemblies 20.

The platform 18 has a pair of ends 22, a top side 24, and a bottom side 26. The platform 18 also comprises a central member 30 and a pair of outer members 32. Each outer member 32 is telescopically coupled to the central member 30 such that the platform 18 has a length between the pair of ends 22 of the platform 18 that is adjustable. Each outer member 32 is hollow and receives the central member 30 through an opening 34 that extends into a respective one of the pair of outer members 32.

Each support assembly 16 also includes a pair of platform locking assemblies 36. Each platform locking assembly 36 secures a respective one of the pair of outer members 32 to the central member 30 in a selected one of a plurality of positions relative to the central member 30. Each platform locking assembly 36 may include a threaded fastener, a clamp, a latch, or the like. In some embodiments, each platform locking assembly 36 comprises a plurality of holes 38 extending into the central member 30 and a spring-biased pin 40 which is coupled to a respective one of the pair of outer members 32. The spring-biased pin 40 of each platform 18 locking member is engageable with a selected one of the plurality of holes 38 to secure the respective one of the pair of outer members 32 to the central member 30.

Each leg assembly 20 is coupled to the bottom side 26 of the platform 18 adjacent to an associated one of the pair of ends 22. Each leg assembly 20 extends downwardly from the platform 18 when the worktable system 10 is positioned in a use configuration 14. Each leg assembly 20 is also pivotably coupled to the platform 18 such that the leg assemblies 20 can pivotably fold toward the platform 18. Each leg assembly 20 is extendable and retractable relative to the platform 18 and comprises a pair of hollow tubes 42 and a pair of columns 44. Each hollow tube 42 is pivotably coupled to the platform 18 and has a distal end 46 relative to the platform 18. Each column 44 is telescopically coupled to a respective one of the pair of hollow tubes 42 and is received through an opening 48 of the respective one of the pair of hollow tubes 42.

Each leg assembly 20 also comprises a pair of leg locking assemblies 50 for securing each column 44 to the respective hollow tube 42. Each leg locking assembly 50 may include a threaded fastener, a clamp, a latch, or the like. In some embodiments, each leg locking assembly 50 comprises a plurality of holes 52 extending into a respective one of the pair of the hollow tubes 42 and a spring-biased pin 54 is coupled to a respective one of the pair of columns 44. The spring-biased pin 54 of each leg locking assembly 50 is engageable with a selected one of the plurality of holes 52 to secure a respective one of the pair of columns 44 to the respective one of the pair of hollow tubes 42.

Each leg assembly 20 further includes a cross member 56 which is coupled to and extends between the pair of hollow tubes 42. The cross member 56 is positioned adjacent to the distal end 46 of each hollow tube 42. An electrical outlet 58 is integrated into and facing away from the cross member 56. An electrical wire 60 is electrically coupled to the electrical outlet 58 and extends away from the cross member 56. A plug 62 is electrically coupled to the electrical wire 60 opposite the electrical outlet 58. The plug 62 is configured for electrically coupling to an electrical power source.

The tabletop 12 is positioned on the top side 24 of the platform 18 of each support assembly 16 when the worktable system 10 is positioned in the use configuration 14. The tabletop 12 has a front side 64, a back side 66, and a pair of lateral sides 68, each lateral side 68 extending between the front side 64 and the back side 66. The tabletop 12 has a plurality of recesses 70, and each recess 70 extends into a respective one of the front side 64, the back side 66, and the pair of lateral sides 68 of the tabletop 12. The recesses 70 corresponding to one of the pair of lateral sides 68 define lateral recesses 72. The tabletop 12 comprises a pair of table panels 74 which are pivotably interconnected along a line 76 extending between the lateral recesses 72. When the worktable system 10 is positioned in the use configuration 14, a top surface 78 of one of the pair of table panels 74 is laterally aligned with a top surface 78 of another one of the pair of table panels 74 and the top surface 78 of each table panel 74 faces upwardly.

Each of a plurality of insertion panels 80 is complementary in shape to and positioned within a respective one of the plurality of recesses 70. Each insertion panel 80 is releasably coupled to the tabletop 12 such that a top surface 82 of the insertion panel 80 aligns with the top surface 78 of each table panel 74. The insertion panels 80 corresponding to the lateral recesses 72 define lateral insertion panels 84. Each lateral insertion panel 84 comprises a pair of subpanels 86 which pivotably interconnected such that the subpanels 86 are permitted to pivot with respect to each other when the lateral insertion panels 84 are coupled to the tabletop 12 and the table panels 74 pivot with respect to each other.

Each insertion panel 80 is slidably coupled to the tabletop 12. The tabletop 12 comprises a plurality of rails 88 protruding into an associated one of the plurality of recesses 70 and extending inwardly from an outer edge 90 of the tabletop 12. Each rail 88 is coupled to one of the table panels 74. Each insertion panel 80 has a pair of grooves 92 for receiving an associated one of the plurality of rails 88 therein such that each insertion panel 80 is slidably movable inwardly and outwardly of the tabletop 12. Each of a plurality of latches 94 is coupled to the outer edge 90 of the tabletop 12 and an outer edge 96 of one of a plurality of insertion panels 80 to releasably couple each insertion panel 80 to the tabletop 12. An indicia 98 is marked on the top surface 78 of each table panel 74 adjacent to an outer edge 90 of the tabletop 12 for indicating distances along the outer edge 90 of the tabletop 12. “Indicia” is used in the detailed description and the claims to refer to both the singular and plural forms of the word.

In use, the worktable system 10 is positionable in the use configuration 14 to be used as a table. One or more of the insertion panels 80 may be removed to create a gap in the tabletop 12 or to replace with a table saw 100 or like tool. While the insertion panels 80 may be designed to slidably couple to the rails 88, table saw 100*s* or other tools may be laid on top of the rails 88 rather than sliding onto them. Tools may be plug 62*ged* into the electrical outlet 58 and the plug 62 may be coupled to an electrical power source to power the tools. When not in use, the table panels 74 can be pivoted to fold the tabletop 12 for storage and transportation. The support assemblies 16 may also be collapsed by retracting the platform 18 of each support assembly 16, retracting the leg assemblies 20 of each support assembly 16, and pivoting the leg assemblies 20 toward the platform 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A worktable system comprising:

a support assembly comprising:

a platform having a pair of ends, a top side, and a bottom side; and a pair of leg assemblies, each said leg assembly being coupled to said bottom side of said platform adjacent to an associated one of said pair of ends, each of said pair of leg assemblies extending downwardly from said platform when said worktable system is positioned in a use configuration;

a tabletop being positioned on said top side of said platform when said worktable system is positioned in said use configuration, said tabletop having a front side, a back side, and a pair of lateral sides, each said lateral side extending between said front side and said back side, said tabletop having a plurality of recesses, each said recess extending into a respective one of said front side, said back side, and said pair of lateral sides of said tabletop, said tabletop comprising a pair of table panels being pivotably interconnected, a top surface of one of said pair of table panels being laterally aligned with a top surface of another one of said pair of table panels and said top surface of each said table panel facing upwardly when said worktable system is positioned in said use configuration;

a plurality of insertion panels, each said insertion panel being complementary in shape to and positioned within a respective one of said plurality of recesses, each said insertion panel being releasably coupled to said tabletop such that a top surface of said insertion panel aligns with said top surface of each said table panel;

said recesses corresponding to one of said pair of lateral sides defining lateral recesses, said pair of table panels being pivotably interconnected along a line extending between said lateral recesses; and said insertion panels corresponding to said lateral recesses defining lateral insertion panels, said lateral insertion panels having a pair of subpanels being pivotably interconnected such that said subpanels are permitted to pivot with respect to each other when said lateral insertion panels are coupled to said tabletop and said table panels pivot with respect to each other.

2. The system of claim 1, further comprising said platform comprising a central member and a pair of outer members being telescopically coupled to said central member, wherein said platform has a length between said pair of ends of said platform that is adjustable.

3. The system of claim 2, further comprising the pair of outer members being hollow and having an opening configured to extend into the opposite outer member when collapsed together, each said outer member receiving said central member through said opening thereof.

4. The system of claim 2, further comprising a pair of platform locking assemblies for securing a respective one of said pair of outer members to said central member.

5. The system of claim 4, further comprising each said platform locking assembly comprising a plurality of holes extending into said central member and a spring-biased pin being coupled to a respective one of said pair of outer members, said spring-biased pin of each said platform locking member being engageable with a selected one of said plurality of holes to secure said respective one of said pair of outer members to said central member.

6. The system of claim 1, further comprising each said leg assembly being pivotably coupled to an upper region of said platform, each said leg assembly being extendable and retractable relative to said platform.

7. The system of claim 6, further comprising each said leg assembly comprising:

a pair of hollow tubes, each said hollow tube being pivotably coupled to said upper region of said platform, each said hollow tube having an opening at a distal end of said hollow tube relative to said platform; and a pair of columns, each said column being telescopically coupled to a respective one of said pair of hollow tubes, each said column being received through said opening of said respective one of said pair of hollow tubes.

8. The system of claim 7, further comprising each said leg assembly further comprising a pair of leg locking assemblies for securing a respective one of said pair of columns to a respective one of said pair of hollow tubes.

9. The system of claim 8, further comprising each leg locking assembly comprising a plurality of holes extending into a respective one of said pair of said hollow tubes and a spring-biased pin being coupled to a respective one of said pair of leg locking assemblies, said spring-biased pin of each said column being engageable with a selected one of said plurality of holes to secure said respective one of said pair of columns to said respective one of said pair of hollow tubes.

10. The system of claim 7, further comprising each said leg assembly further comprising:

a cross member being coupled to and extending between said pair of hollow tubes, said cross member being positioned adjacent to said distal end of each said hollow tube;

an electrical outlet being integrated into and facing away from said cross member;

an electrical wire being electrically coupled to said electrical outlet and extending away from said cross member; and a plug being electrically coupled to said electrical wire opposite said electrical outlet.

11. The system of claim 1, further comprising said plurality of insertion panels being slidably coupled to said tabletop.

12. The system of claim 11, further comprising said tabletop comprising a plurality of rails protruding into an associated one of said plurality of recesses and extending inwardly from an outer edge of said tabletop, each said rail being coupled to one of said table panels, each said insertion panel having a pair of grooves for receiving an associated one of said plurality of rails therein such that each said insertion panel is slidably movable inwardly and outwardly of said tabletop.

13. The system of claim 11, further comprising a plurality of latches, each said latch being coupled to said outer edge of said tabletop and an outer edge of one of said plurality of insertion panels to releasably couple each said insertion panel to said tabletop.

14. The system of claim 1, further comprising an indicia being marked on said top surface of each said table panel adjacent to an outer edge of said tabletop for indicating distances along said outer edge.

15. A worktable system comprising:

a pair of support assemblies, each said support assembly comprising:

a platform having a pair of ends, a top side, a bottom side, and a pair of lateral sides, said platform comprising a central member and a pair of outer members being telescopically coupled to said central member, wherein said platform has a length between said pair of ends of said platform that is adjustable, the pair of outer members being hollow and having an opening configured to extend into the opposite outer member when collapsed together, each said outer member receiving said central member through said opening thereof;

a pair of platform locking assemblies, each said platform locking assembly comprising a plurality of holes extending into said central member and a spring-biased pin being coupled to a respective one of said pair of outer members, said spring-biased pin of each said platform locking member being engageable with a selected one of said plurality of holes to secure said respective one of said pair of outer members to said central member;

a pair of leg assemblies, each said leg assembly being coupled to said bottom side of said platform adjacent to an associated one of said pair of ends, each said leg assembly extending downwardly from said platform when said worktable system is positioned in a use configuration, each said leg assembly being pivotably coupled to said platform, each said leg assembly being extendable and retractable relative to said platform, each said leg assembly comprising:

a pair of hollow tubes, each said hollow tube being pivotably coupled to said platform, each said hollow tube having an opening at a distal end of said hollow tube relative to said platform;

a pair of columns, each said column being telescopically coupled to a respective one of said pair of hollow tubes, each said column being received through said opening of said respective one of said pair of hollow tubes;

a pair of leg locking assemblies, each leg locking assembly comprising a plurality of holes extending into a respective one of said pair of said hollow tubes and a spring-biased pin being coupled to a respective one of said pair of columns, said spring-biased pin of each said leg locking assembly being engageable with a selected one of said plurality of holes to secure said respective one of said pair of columns to said respective one of said pair of hollow tubes;

a cross member being coupled to and extending between said pair of hollow tubes, said cross member being positioned adjacent to said distal end of each said hollow tube;

an electrical outlet being integrated into and facing away from said cross member, an electrical wire being electrically coupled to said electrical outlet and extending away from said cross member, and a plug being electrically coupled to said electrical wire opposite said electrical outlet;

a tabletop being positioned on said top side of said platform of each said support assembly when said worktable system is positioned in said use configuration, said tabletop having a front side, a back side, and a pair of lateral sides, each said lateral side extending between said front side and said back side, said tabletop having a plurality of recesses, each said recess extending into a respective one of said front side, said back side, and said pair of lateral sides of said tabletop, said recesses corresponding to one of said pair of lateral sides defining lateral recesses, said tabletop comprising a pair of table panels being pivotably interconnected along a line extending between said lateral recesses, a top surface of one of said pair of table panels being laterally aligned with a top surface of another one of said pair of table panels and said top surface of each said table panel facing upwardly when said worktable system is positioned in said use configuration;

a plurality of insertion panels, each said insertion panel being complementary in shape to and positioned within a respective one of said plurality of recesses, each said insertion panel being releasably coupled to said tabletop such that a top surface of said insertion panel aligns with said top surface of each said table panel, said insertion panels corresponding to said lateral recesses defining lateral insertion panels, said lateral insertion panels having a pair of subpanels being pivotably interconnected such that said subpanels are permitted to pivot with respect to each other when said lateral insertion panels are coupled to said tabletop and said table panels pivot with respect to each other;

said plurality of insertion panels being slidably coupled to said tabletop, said tabletop comprising a plurality of rails protruding into an associated one of said plurality of recesses and extending inwardly from an outer edge of said tabletop, each said rail being coupled to one of said table panels, each said insertion panel having a pair of grooves for receiving an associated one of said plurality of rails therein such that each said insertion panel is slidably movable inwardly and outwardly of said tabletop;

a plurality of latches, each said latch being coupled to said outer edge of said tabletop and an outer edge of one of said plurality of insertion panels to releasably couple each said insertion panel to said tabletop; and an indicia being marked on said top surface of each said table panel adjacent to an outer edge of said tabletop for indicating distances along said outer edge.

* * * * *